(12) United States Patent
Patil et al.

(10) Patent No.: US 8,202,946 B2
(45) Date of Patent: Jun. 19, 2012

(54) METHOD OF MAKING GRAFT COPOLYMERS FROM SODIUM POLY(ASPARTATE) AND THE RESULTING GRAFT COPOLYMER

(75) Inventors: Damodar R. Patil, Palos Hills, IL (US); Laiduien G. Fan, Naperville, IL (US); Joseph C. Fan, Naperville, IL (US); Jiangping Yu, Vernon Hills, IL (US)

(73) Assignee: NanoChem Solutions, Inc., Bedford Park, IL (US)

( * ) Notice: Subject to any disclaimer, the term of this patent is extended or adjusted under 35 U.S.C. 154(b) by 0 days.

(21) Appl. No.: 13/068,079

(22) Filed: May 2, 2011

(65) Prior Publication Data
US 2011/0213099 A1    Sep. 1, 2011

Related U.S. Application Data

(63) Continuation of application No. 12/210,268, filed on Sep. 15, 2008, now Pat. No. 7,999,040.

(60) Provisional application No. 60/995,043, filed on Sep. 25, 2007.

(51) Int. Cl.
C08G 69/10 (2006.01)
C08F 20/54 (2006.01)
C08L 77/04 (2006.01)
C08L 79/08 (2006.01)

(52) U.S. Cl. ........ 525/426; 525/418; 525/419; 525/420; 525/421; 528/327; 528/328; 528/363

(58) Field of Classification Search ........... 525/418, 525/419, 420, 421, 426; 528/327, 328, 363
See application file for complete search history.

(56) References Cited

U.S. PATENT DOCUMENTS
5,747,635 A * 5/1998 Kroner et al. ........... 528/328
* cited by examiner

*Primary Examiner* — Ana Woodward
(74) *Attorney, Agent, or Firm* — Mathew R. P. Perrone, Jr.

(57) ABSTRACT

A variety of graft copolymers can be formed sodium poly (aspartate) with a wide variety of monomers in an aqueous medium by the use of grafting method in the presence of radical initiator at a temperature of from about five degrees Centigrade to about 100 degrees Centigrade. Graft copolymers at high conversion with molecular weight up to millions can be prepared using this method.

8 Claims, No Drawings

METHOD OF MAKING GRAFT COPOLYMERS FROM SODIUM POLY(ASPARTATE) AND THE RESULTING GRAFT COPOLYMER

CROSS REFERENCE TO RELATED APPLICATION

This application is based, in part, on U.S. Provisional Application Ser. No. 60/995,043, filed Sep. 25, 2007, and incorporated herein by reference, and is a continuation of U.S. patent application Ser. No. 12/210,268 filed Sep. 15, 2008 now U.S. Pat. No. 7,999,040.

This invention relates to a method of making graft copolymers and the resulting graft copolymer, and more particularly to a method of making graft copolymers from sodium poly (aspartate) and the resulting graft copolymer.

BACKGROUND OF THE INVENTION

The function and utility of graft copolymers become clear when dealing U.S. Pat. No. 6,723,775, to Lau et al., which patent is incorporated herein by reference. Graft copolymers relate to a polymeric backbone having side chains of a different property or composition chemically attached thereto. Such polymers have very desirable film qualities. They can also be used to affect the structural qualities of other polymers in a desired fashion. Many uses of sodium poly(aspartate) to make a resulting graft copolymer are known, but they are inefficient for making intermediate products.

One known process uses the condensation method to make copolymers of sodium polyaspartic acid. They start the reaction with the use of L-Aspartic acid and other acids to terminate the polymerization process. In this case, because of the involvement of a second acid, it becomes a final product. It is suitable for use in forming copolymers or comb-graft copolymer only when the second acid contains a hydroxyl (—OH) terminated group).

Other processes using sodium poly(aspartate) form aqueous emulsion polymers and use at least one metal promoter complex, which greatly complicates the process. Other sodium poly(aspartate) uses are to form siloxane polymers, with a different redox system.

It is very desirable to solve the problems of these processes and achieve a more useful product.

SUMMARY OF THE INVENTION

Among the many objectives of the present invention is the provision of a method for making graft copolymer prepared from sodium poly(aspartate) with a number of monomers in an aqueous medium by the use of grafting method in the presence of radical initiator.

Another objective of the present invention is the provision of a method for making a graft copolymer prepared from sodium poly(aspartate) with a molecular weight up to the millions.

Yet another objective of the present invention is the provision of a method for making a graft copolymer prepared from sodium poly(aspartate) using ultra violet light.

Still another objective of the present invention is the provision of a product made by the method for making a graft copolymer prepared from sodium poly(aspartate) using gamma radiation.

Also an objective of the present invention is the provision of a product made by the method for making a graft copolymer prepared from sodium poly(aspartate) using an organic solvent system in the presence of an initiator.

These and other objectives of the invention (which other objectives become clear by consideration of the specification, claims and drawings as a whole) are met by providing a method for reacting sodium poly(aspartate) with a wide variety of monomers.

DESCRIPTION OF THE PREFERRED EMBODIMENTS

In the present invention, a new method is disclosed to prepare graft copolymers from sodium poly(aspartate). The graft copolymers are prepared from sodium poly(aspartate) with a number of monomers in an aqueous medium by the use of grafting method in the presence of radical initiator. Graft copolymers at high conversion with a molecular weight up to the millions can be prepared using this method.

These polymers are preferably formed at a temperature of from about five degrees Centigrade to about 100 degrees Centigrade. More preferably, these polymers formed at a temperature of from about ten degrees Centigrade to about 100 degrees Centigrade. Most preferably, these polymers formed at a temperature of from about twenty degrees Centigrade to about 100 degrees Centigrade.

The polymers thus prepared have many uses. They may be used in water treating or industrial uses for scale inhibitors, and corrosion inhibitors. The polymers also have uses for their surfactant properties scale control properties, chelation properties, gas hydration properties or the properties achieved as a result of the processes ability to add almost any functional group thereto. Others uses include in industries such as detergent, dispersant, agriculture, personal care, superabsorbents, bio-degradable packaging material (bio-degradable plastics) (like poly-lactate etc), food additives (such as thickeners and other), medicine (such as an adhesive bandage), adhesives (such as biodegradable self-stick glue available from the 3M Company and others), coatings, and paint additive such as green thickener, dispersant or others etc).

The electronic industry also provides many uses for these polymers. For example, potential vapor phase corrosion inhibitor or etching coating for circuit board are some of the many uses. The battery industry to increase battery efficiency is another use.

These polymers also have fuel uses. Modifying bio-diesel properties (such as de-watering), heavy metal removal, flocculation, and coagulation uses are available. Bio-degradable pesticides, insecticides, and herbicides are additional uses for these polymers. Food preservation is enhanced with packaging materials. Slow release mechanisms are provided for fertilizers, medicines, coating, and packaging are provided. A degradable concrete additive, such as a dispersant or a de-watering agent, can be provided. Other construction material uses include dry wall or gypsum board making, or a dispersant function. Another medical use includes a kidney dialysis type of medical procedure utilizing molecular sizing/chelation and other functions to remove un-wanted ingredients in the matrix.

The graft copolymers are prepared in accordance to the following preferred method.

A weighed amount of sodium poly(aspartate) is added in a three necked round bottomed flask fitted with condenser and nitrogen inlet tube. A known amount of water is added and the mixture is stirred to dissolve sodium poly(aspartate).

Ferrous ammonium sulfate in the amount about 0.1 to about 10 percent by weight of the solution is added to the above solution of known pH and the whole solution is bubbled with nitrogen for half an hour with stirring. Hydrogen peroxide about 0.1 to about 20 percent by weight of the solution is added to the solution and monomer or mixture of monomers added either before or after hydrogen peroxide addition. Reaction continues for three hours under nitrogen blanket with stirring at room temperature.

Preferably, the pH is about 3.0 to about 7.0. More preferably, the pH is about 3.2 to about 4.0. Most preferably, the pH is about 3.4 to about 3.6. Preferably, ferrous ammonium sulfate or its equivalent as set forth below in the amount about 0.1 to about 30 percent by weight of the solution is added to the above solution. More preferably, ferrous ammonium sulfate or its equivalent as set forth below in the amount about 0.1 to about 20 percent by weight of the solution is added to the above solution. Most preferably, ferrous ammonium sulfate or its equivalent as set forth below in the amount about 0.1 to about 10 percent by weight of the solution is added to the above solution. Preferably, hydrogen peroxide about 0.1 to about 50 percent by weight of the solution is added to the above solution. More preferably, hydrogen peroxide about 0.1 to about 30 percent by weight of the solution is added to the above solution. Most preferably, hydrogen peroxide about 0.1 to about 20 percent by weight of the solution is added to the above solution.

The polymers prepared by this process are purified either by precipitating with an organic solvent such as methanol, ethanol and acetone or dialyzing the aqueous polymer solution with dialysis membrane and recovering the polymer by freeze drying. However, polymers prepared by this process can be used directly without further purification.

In this process, sodium poly(aspartate) polymer is preferred to act as a backbone for grafted polymer chains. Other appropriate polymer backbones are sodium or lithium or potassium or ammonium poly(aspartate), polyvinyl alcohol, inulin, maltodextrins and natural gums Sodium poly(aspartate) used in this invention, is prepared by hydrolyzing poly(succinimide) (PSI) with sodium hydroxide, which in turn is prepared from L-aspartic acid by heating at high temperature in the presence or absence of catalyst. Any base may be used to hydrolyze poly(succinimide) to make water soluble poly(aspartate) salt. Bases that are useful in hydrolyzing the PSI include all bases, such as, for example, hydroxides and carbonates of alkali metals such as potassium, lithium, ammonia, besides sodium. Sodium poly(aspartate) used in this invention has weight average molecular weight from 1,000 to 50,000. Further, any water soluble, synthetic or natural polymer, such as modified poly(aspartic acid), poly(vinyl)alcohol, poly(ethyleneimine) inulin, maltodextins, chitosan, pectin, algin, agar, gum arabic, tragacanth, karaya gum, gum ghatti, guar gum, and others can also be used to prepare graft copolymers with the disclosed method.

The redox systems used as initiators in this process are but not limited to ferrous ammonium sulfate/hydrogen peroxide, ferrous ammonium sulfate/sodium persulfate, sodium bisulfite/sodium persulfate, sodium bisulfite/potassium persulfate and others. Furthermore, water soluble metal salts such as salts of cobalt, copper and manganese may be used instead of iron salts. The desired ratios of reducing agent to oxidizing agent are from about 0.1 percent to about ten percent to about 0.1 percent to about forty percent. More preferably, the desired ratios of reducing agent to oxidizing agent are from about 0.1 percent to about ten percent to about 0.1 percent to about thirty percent. Most preferably, the desired ratios of reducing agent to oxidizing agent are from about 0.1 percent to about ten percent to about 0.1 percent to about twenty percent.

The radical initiators such as sodium persulfate, potassium persulfate, ammonium persulfate, hydrogen peroxide, ter-butyl peroxide, ter-butyl hydroperoxide, cumyl hydroperoxide, 2,2'-azobis(isobutyronitrile), 2,2'-azobis(2,4-dimethylvaleronitrile), 1,1'-azobis(cyclohexanecarbonitrile), 4,4'-azobis(4-cynovaleric acid), benzoyl peroxide and cerium ammonium nitrate are also be used at the level of 0.1 to 20% based on sodium poly(aspartate) to prepare graft copolymers.

The monomers, which can be use include, but are not limited to acrylic acid, methacrylic acid, itaconic acid, maleic acid, maleic anhydride, methyl acrylate, ethyl acrylate, butyl acrylate, hexyl acrylate, isooctyl acrylate, isodecyl acrylate, lauryl acrylate, octadecyl acrylate, hydroxyl methyl acrylate, hydroxyl ethyl acrylate, methyl methacrylate, acrylonitrile, styrene, vinyl acetate, vinyl propionate, vinyl butyrate, acrylamide, methyl acrylamide, methyl methacrylamide, dimethyl acrylamide, ethyl acrylamide, ethyl methacrylamide, diethyl acrylamide, n-isopropyl acrylamide, n-isopropyl methacrylamide, iso-butyl acrylamide, n-butyl acrylamide, diacetone acrylamide, acrylamidomethylpropane sulfonic acid, vinyl sulfonic acid, allyl sulfonic acid, styrene sulfonic acid, vinyl pyrrilidone, vinyl imidazole, vinyl formamide, vinyl caprolactam, vinyl pyridine, n-methylaminomethyl acrylate, dimethylaminomethyl acrylate, n-methylaminoethyl acrylate, dimethylaminoethyl acrylate, n-ethylaminomethylacrylate, diethylaminomethylacrylate, n-ethylaminoethylacrylates, diethylaminoethylacrylates, acryloylmorpoline, acryloyl pyrrolidine, methacryloyl pyrrolidine, ethyloxazoline, n-vinyl acetamide and n-methyl-n-vinyl acetamide, can be grafted to the polymer backbone at level between about one percent to 95 percent, either alone or in combination with others.

The graft copolymerization of sodium poly(aspartate) with monomers can also be carried out by the action of ultraviolet, gamma (cobalt 60) and electron beam radiation. For the polymerization under the action of ultra violet (UV) radiation, the conventional photoinitiators or sensitizers are used. The UV radiation sources used are, for example, high energy UV lamps, such as carbon arc lamps, mercury vapor lamps or xenon lamps.

The polymerization is usually carried out in an inert atmosphere in the absence of atmospheric oxygen, and the polymerization temperatures that are useful in graft polymerization are from about five degrees Centigrade to about 100 degrees Centigrade. These temperatures allow the polymerization to be completed in a time about 30 minutes to 3 hours and the polymerization is run from about 10 to about 80 weight percent solids.

Further, graft copolymerization can be carried out in organic solvents such as dimethyl sulfoxide (DMSO), dimethyl acetamide (DMAC), dimethyl formamide (DMF), N-ethyl pyrrolidone (NEP), N-methyl pyrrolidone (NMP) and the mixtures of these solvents, with or without water, in the presence of solvent soluble radical initiators at temperature from 20 five degrees Centigrade to about 150 degrees Centigrade The water soluble graft copolymers prepared by this process have been shown to have potential to act as scale inhibitors, corrosion inhibitors and gas hydrate inhibitors. Further, polymers produced according to this invention are useful as deflocculating and dispersing agents, flocculating agent, thickeners and plant growth enhancers.

In the following examples which are intended to further illustrate the invention, but not to be construed as limitations upon the present invention, all parts and percentages are by weight, unless otherwise specified.

Example 1

About 10.5 grams sodium poly(aspartate) (38%) is added in 10 ml of water in a 100 ml three necked round bottomed flask fitted with condenser and nitrogen inlet tube. The pH of the solution is adjusted to 3.5 with nitric acid. 0.16 grams of ferrous ammonium sulfate is added to the above solution in the flask and the whole solution is bubbled with nitrogen for half an hour with stirring. Then 0.32 grams of hydrogen peroxide is added to the solution and 1.72 grams of vinyl pyrrolidone is added 2 minutes after hydrogen peroxide addition. Reaction is continued for three hours under nitrogen blanket with stirring at room temperature. The resulting solution weighs 22 grams with a solid content of 25 weight percent.

Example 2

About 10.5 grams sodium poly(aspartate) (38%) is added in 10 ml of water in a 100 ml three necked round bottomed flask fitted with condenser and nitrogen inlet tube. The pH of the solution is adjusted to 3.5 with nitric acid. 0.16 grams of ferrous ammonium sulfate is added to the above solution in the flask and the whole solution is bubbled with nitrogen for half an hour with stirring. Then 0.32 grams of hydrogen peroxide is added to the solution and 1.72 grams of dimethyl aminoethyl acrylate is added 2 minutes after hydrogen peroxide addition. Reaction is continued for three hours under nitrogen blanket with stirring at room temperature. The resulting solution weighs 22 grams with a solid content of 25 weight percent.

Example 3

About 10.5 grams sodium poly(aspartate) (38%) is added in 10 ml of water in a 100 ml three necked round bottomed flask fitted with condenser and nitrogen inlet tube. The pH of the solution is adjusted to 3.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1.72 grams of vinyl imidazole is added 2 minutes after hydrogen peroxide addition. Reaction is continued for three hours under nitrogen blanket with stirring at room temperature. The resulting solution weighs 22 grams with a solid content of 25 weight percent.

Example 4

About 10.5 grams sodium poly(aspartate) (38%) is added in 10 ml of water in a 100 ml three necked round bottomed flask fitted with condenser and nitrogen inlet tube. pH of the solution is adjusted to 3.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1.72 grams of acryloyl morholine is added 2 minutes after hydrogen peroxide addition. Reaction is continued for three hours under nitrogen blanket with stirring at room temperature. The resulting solution weighs 22 grams with a solid content of 25 weight percent.

Example 5

10.5 grams sodium poly(aspartate) (38%) is added in 1 ml of water in a 100 ml' three necked round bottomed flask fitted with condenser and nitrogen inlet tube. pH of the solution is adjusted to 3.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1 grams of vinyl caprolactam dissolved in 20 ml of water is added 2 minutes after hydrogen peroxide addition. Reaction continued for three hours under nitrogen blanket with stirring at room temperature. The resulting solution weighs 35 grams with a solid content of 14 weight percent.

Example 6

About 10.5 grams sodium poly(aspartate) (38%) is added in 10 ml of water in a 100 ml three necked round bottomed flask fitted with condenser and nitrogen inlet tube. pH of the solution is adjusted to 6.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1.72 grams of dimethyl acrylamide is added 2 minutes after hydrogen peroxide addition. Reaction is continued for three hours under nitrogen blanket with stirring at room temperature. The resulting solution weighs 22 grams with a solid content of 25 weight percent.

Example 7

About 10.5 grams sodium poly(aspartate) (38%) is added in 35 ml of water in a 100 ml three necked round bottomed flask fitted with condenser and nitrogen inlet tube. pH of the solution is adjusted to 6.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1.0 grams of isopropyl acrylamide dissolved in 8 ml of water is added 2 minutes after hydrogen peroxide addition. Reaction is continued for three hours under nitrogen blanket with stirring at room temperature. The resulting solution weighs 55 grams with a solid content of 9 weight percent.

Example 8

About 10.5 grams sodium poly(aspartate) (38%) is added in 10 ml of water in a 100 ml three necked round bottomed flask fitted with condenser and nitrogen inlet tube. pH of the solution is adjusted to 3.5 with nitric acid. 0.16 grams of ferrous ammonium sulfate is added to the above solution in the flask and the whole solution is bubbled with nitrogen for half an hour with stirring. 0.32 grams of hydrogen peroxide is added to the solution and 1.72 grams of vinyl formamide is added 2 minutes after hydrogen peroxide addition. Reaction is continued for three hours under nitrogen blanket with stirring at room temperature. The resulting solution weighs 22 grams with a solid content of 25 weight percent.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A process for preparing a graft copolymer of a polyaspartate comprising:
    providing an amount of sodium poly(aspartate);
    adding water to the sodium poly(aspartate);
    mixing the water with the sodium poly(aspartate) to dissolve the sodium poly(aspartate) and form a solution;
    adding ferrous ammonium sulfate in the amount of about 0.1 to about 30 percent by weight of the solution to the solution;
    bubbling the solution with nitrogen while stirring the solution;
    adding hydrogen peroxide in the amount of about 0.1 to about 50 percent by weight of the solution to the solution;
    adding at least one monomer to the solution either before or after adding the hydrogen peroxide in order to form the graft copolymer;
    continuing treatment with nitrogen under a nitrogen blanket with stirring at room temperature to form the graft copolymer; and recovering the graft copolymer.

2. The process of claim 1 wherein the at least one monomer is selected from at least one of the group consisting of acrylic acid, methacrylic acid, itaconic acid, maleic acid, maleic anhydride, methyl acrylate, ethyl acrylate, butyl acrylate, hexyl acrylate, isooctyl acrylate, isodecyl acrylate, lauryl acrylate, octadecyl acrylate, hydroxyl methyl acrylate, hydroxyl ethyl acrylate, methyl methacrylate, acrylonitrile, styrene, vinyl acetate, vinyl propionate, vinyl butyrate, acrylamide, methyl acrylamide, methyl methacrylamide, dimethyl acrylamide, ethyl acrylamide, ethyl methacrylamide, diethyl acrylamide, n-isopropyl acrylamide, n-isopropyl methacrylamide, iso-butyl acrylamide, n-butyl acrylamide, diacetone acrylamide, vinyl sulfonic acid, allyl sulfonic acid, styrene sulfonic acid, vinyl imidazole, vinyl formamide, vinyl caprolactam, vinyl pyridine, n-methylamino-methyl acrylate, dimethylaminomethyl acrylate, n-methylaminoethyl acrylate, dimethylaminoethyl acrylate, n-ethylaminomethylacrylate, diethylaminomethylacrylate, acryloyl pyrrolidine, methacryloyl pyrrolidine, ethyloxazoline, n-vinyl acetamide and n-methyl-n-vinyl acetamide.

3. The process of claim 1 comprising:
    adding the ferrous ammonium sulfate in the amount of about 0.1 to about 20 percent by weight of the solution to the solution;
    adding the nitrogen under a nitrogen blanket with stirring at room temperature for three hours; and
    adjusting the pH of the solution to about 3.0 to about 7.0.

4. The process of claim 3 comprising:
    adding the ferrous ammonium sulfate in the amount of about 0.1 to about 10 percent by weight of the solution to the solution;
    adjusting the pH of the solution to about 3.2 to about 4.0; and
    adding the hydrogen peroxide of about 0.1 to about 30 percent by weight of the solution to the solution.

5. The process of claim 4 comprising:
    adjusting the pH of the solution to about 3.4 to about 3.6; and
    adding the hydrogen peroxide in the amount of about 0.1 to about 20 percent by weight of the solution to the solution.

6. The process of claim 5 comprising purifying the graft copolymer by precipitating the polymer or dialyzing the solution prior to the recovering.

7. The process of claim 6 comprising precipitating the polymer with methanol, ethanol or acetone.

8. The process of claim 6 further comprising dialyzing the solution with a dialysis membrane; and
    recovering the polymer by freeze drying.

* * * * *